May 2, 1967  G. KUSKEVICS ET AL  3,317,224
FLANGED PIPE COUPLING HAVING METALLIC SEAL MEANS
Filed Sept. 23, 1964

INVENTORS
GUNTIS KUSKEVICS
CARL W. SCOTT
BY William A. Zemmel Jr.
ATTORNEY

United States Patent Office 3,317,224
Patented May 2, 1967

3,317,224
FLANGED PIPE COUPLING HAVING METALLIC SEAL MEANS
Guntis Kuskevics, South Pasadena, and Carl W. Scott, Sierra Madre, Calif., assignors to Electro-Optical Systems, Inc., Pasadena, Calif., a corporation of California
Filed Sept. 23, 1964, Ser. No. 398,550
1 Claim. (Cl. 285—363)

The present invention relates in general to devices and processes by means of which hermetic seals are effected, and more particularly to a new device and process whereby a metal gasket and metal foil are utilized between two metal flanges to obtain a satisfactory hermetic seal between abutting surfaces.

It has been common practice in the past, and particularly in devices connected with vacuum systems, to employ elastomeric or rubberized gaskets for the purpose of effecting hermetic seals between abutted surfaces, such as pipes or flanges. However, there are many disadvantages in employing elastomeric seals. Gaskets used in this way have been found costly and cumbersome. Frequent failure of the vulcanized seals of the elastomer to both sides of the metal ring create high replacement costs, particularly where large gaskets are necessary. Another disadvantage is the high and undesirable permeation or leakage rate through the elastomer. Other disadvantages are high outgassing rates and hydrocarbon contamination. The temperature range in which elastomer seals can be operated is narrow. They cannot be used at liquid nitrogen temperature or for a bakeout up to, for example, 300° C. Other all metal seals usually require large numbers of bolts, accurately machined surfaces and expensive seal materials.

Attempts to cover the above-mentioned problems have been the subject of many experiments over a long period of time. Yet, the attempts have met with little success. Therefore, the need to provide some simple, easily operable and yet inexpensive and reliable device and process has continued.

It is, therefore, an object of the present invention to provide a convenient, easily operable device that will produce a reliable hermetic seal with suitably small permeation or leakage.

It is another object of the present invention to provide a simple device to produce a satisfactory hermetic metal seal which is interchangeable with other flanges without the necessity of new machining.

It is a further object of the present invention to provide a device which eliminates the use of elastomeric seals and yet effects a suitably reliable hermetic seal.

It is a further object of the present invention to provide a reliable hermetic seal which is easily disassembled and reassembled as a need occurs.

It is another object of the present invention to provide a device which will produce a bakeable metal hermetic seal under extreme pressure having a wide temperature range from the temperature of liquid nitrogen to 350° C. and higher.

It is still another object of the present invention to provide a device and process to convert the elastometer O-ring seal vacuum system known to the prior art to reliable metal sealed vacuum systems.

Although metal hermetic seals have been known and used in the past, the present invention introduces important improvements over the prior art. It is designed to eliminate many disadvantages of presently used devices and processes by providing a metal hermetic seal between two metal flanges with the use of a tapered metal gasket and metal foil interposed between said flanges. In a more detailed manner, a pair of flat metal flange members are mounted opposite each other on the pipes or tubes to be sealed. Metal foil is pressed against the outer end surface of each of said flange members. Between and contacting the metal foil is a metal gasket having a symmetrical inwardly extending taper and spiral groove finish. Finally, mechanical means are provided for compressing the flange members together and clamping the gasket and foil layers therebetween. The seal produced as the flange members come in contact with the metal foil layers and the metal gasket is maintained over an extremely wide temperature range from the temperature of liquid nitrogen to 350° C. and higher. The result is a mechanically simple, economical, device and process for a reliable hermetic seal.

Other objects and advantages of the present invention will be readily apparent from the following description and the drawings in which is illustrated an exemplary embodiment of this invention.

The novel features which are believed to be characteristic of the present invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 1:
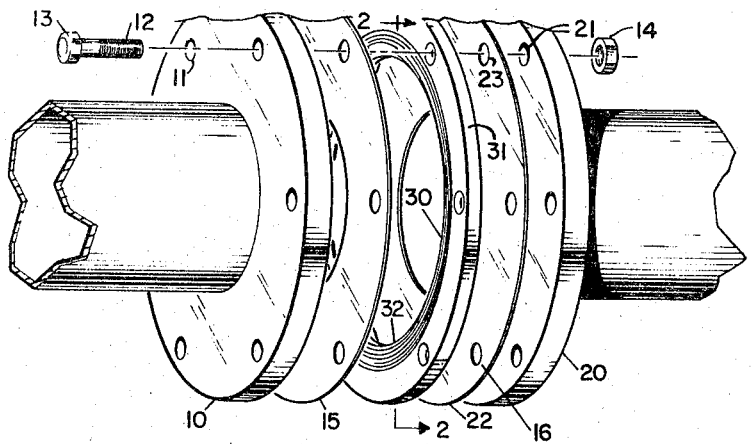
FIG. 1 is an exploded view of the seal of the present invention between two pipes.
Figure 2:
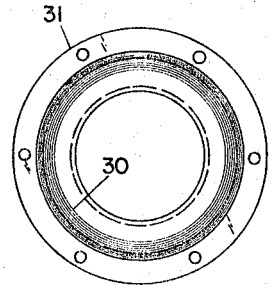
FIG. 2 is an enlarged plan view of the gasket portion of FIG. 1 taken along the lines 2—2 of FIG. 1.

For a detailed description of the features of the present invention reference is now made to FIGS. 1–4 in the drawing wherein is included a first flat flange member 10 which is constructed of metal, being of a thickness, for example, of about ½″ to ¾″ for a 6″ to 8″ diameter flange, although the thickness is not limited to these specific measurements (which are set out merely by way of example). An extremely wide range of material may be utilized in fact, ranging from a thickness no more than approximately twice that of the foil itself to a great thickness where desirable. In the prior art flanges used for metal seals were necessarily thick as they had to withstand the extreme pressure exerted against them which was needed not only to create the seal, but required at all times to maintain the seal. The present invention, which takes only a minimum amount of pressure to effect and maintain the desired seal can utilize a much thinner metal flange, as noted above, and yet realize a hermetic seal which is satisfactory. The first flange member 10 is designed to contain spaced holes 11 along its peripheral edge to permit the insertion of a bolt 12 having a cap 13 on one end of the bolt and the bolt being threaded on the other end for the attachment of a nut 14. A single layer of soft metal foil, such as aluminum or copper foil, by way of example only and not limited thereto, 15 and of any desired and uniform thickness, also having evenly spaced holes 16 through which the bolt 12 passes, is laid firmly against the outer end surface of said first member 10.

A second flat metal flange member 20 is placed in a position opposite to the first flange member 10. The second flange member 20 also utilizes thinner metal, such as is described supra relating to the first flange member 10, such metal being of the range of quality described therein and for the same reasons as those set out in describing the first flange member supra. However, it should be noted that flange members 10 and 20 respectively may be of the quality of metal presently used with an elastomer gasket and new machining is unnecessary to convert from an elastomeric seal to the foil seal of the present invention. The second flange member 20 is also designed to contain spaced holes 21 along its peripheral edge to allow the insertion of bolt 12. An associated nut 14 in combination with the bolt 12 forms the means for compressing the flange members 10 and 20 towards each other. A single layer of metal foil 22 is laid firmly against the outer end surface of said second flange member 20, said foil also having evenly spaced holes 23 through which the bolt 12 passes.

A metal gasket 30 is interposed between the metal foil layers 15 and 22, which gasket is secured by a metal ring positioner 31. The positioner 31 is similar to those used with elastomeric seals. In the prior art where metal seals were used, great pressure had to be exerted to create a hermetic seal and great pressure had to be maintained to maintain the seal at all. To withstand such pressure, thick metals had to be used for flanges. In the present invention, however, a very slight pressure suffices to create and also to maintain a hermetic seal, thus obviating the necessity of using thick metal. The metal need be, as stated supra, and by way of example only, about ½" to ¾" for a 6" to 8" diameter.

Figure 3:
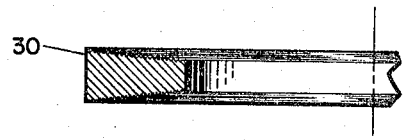
FIG. 3 is a partial cross-sectional view of the metal gasket illustrating the taper taken along the lines 4—4 of FIG. 4.
Figure 4:
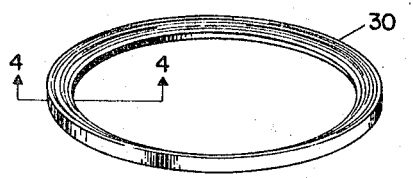
FIG. 4 is a plan view of the gasket illustrating the inward taper and the pattern of phonograph record-like spiral grooving.

The metal gasket 30 contains a spiral groove finish 32, to a depth, for example, of .0015 inch, as illustrated in FIG. 4 herein. The spiral groove is comparable to that of a phonograph record and its cut. When the foil is compressed against and into the grooving an impediment occurs to any leakage by reason of the long spiral path fluid would have to travel. Even under extreme temperature this spiral configuration contributes to the maintenance of the hermetic seal. Said metal gasket 30 has a very slight symmetrically inward taper of about 1–5°, as illustrated in FIG. 3 herein. This very slight inward taper makes it possible to obtain a satisfactory hermetic seal at the point where the flange members 10 and 20 respectively first come in contact with the most outwardly portion of the tapered surface. From this it can be seen that it is unnecessary for the entire surface of the gasket to be engaged to either create or maintain the seal, and further only a very slight pressure exerted by compressing said flange members 10 and 20 is necessary to bring them in contact with this outer-most tapered surface. Should an even tighter seal be desirable, slightly increased pressure will bring the flange members 10 and 20 in contact with a larger portion of the tapered surface. The range of the seal is from approximately .020 to 1/10". Illustrated in FIG. 3 herein.

To effect the desired seal the nut 14 is tightened onto the threaded end of the bolt 13, compressing the first flange member 10 and the second flange member 20 toward each other. The pressure exerted as bolt 12 is tightened is very slight. The compressing of said members 10 and 20 bring their foil covered end surfaces in contact first with the extreme outwardly portion of the tapered metal gasket 30 to create the seal. If an even tighter seal is desired, a very slight additional pressure may be exerted which will cause the foil covered surfaces of the flanges to move in along the taper, the seal being maintained against the spiral grooving 32 of the metal gasket 30 although groove alignment is unnecessary either to create or maintain said seal in a satisfactory condition. The slight pressure of the foil covered surfaces of the flange members against the taper of the metal gasket creates the seal. The simple act of turning the nut in a reverse direction is sufficient to break the seal. The nut may in this manner be entirely removed from the bolt and the device can be disconnected with agility and speed.

Figure 5:
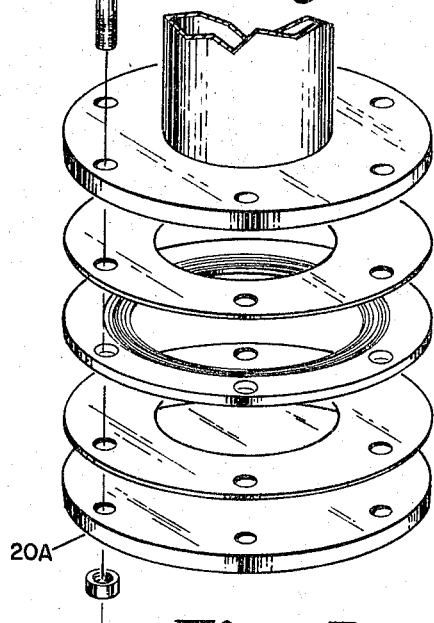
FIG. 5 is an exploded view of a joint between a pipe and its cover plate using the seal of the present invention.

The device shown in FIG. 1 is for interconnecting a pair of pipes or tubes for providing a hermetic seal therein. Since frequent occasions arise where hermetic seals are also needed at the end of a pipe or tube rather than between them and yet there is also need for quickly dismantling the device so that either solder nor welding could be used, the device illustrated in FIG. 1 is modified or adapted for the purpose of creating a reliable hermetic seal at the end of a pipe. This is illustrated in FIG. 5, to which reference is now made. All the features are designated as they were above; however, instead of the second flat flange member, shown at 20, being designed with a center area open to allow a pipe or tube to pass through and interconnect with another pipe or tube, the said second flat flange member is designed as a solid end cover plate 20–A. In all other respects the device is the same and the process for effecting said hermetic seal is identical.

This is a significant improvement over the prior art where constant resealing was necessary and constant surveillance had to exist to detect leakage and to remedy it.

Other adaptations and modifications are indeed possible and thus the present device and process shown in the figures should be considered as included in the invention as defined by the annexed claim.

Having thus described the invention, what is claimed is:

A device for interconnecting a pair of pipes and on the end of a single pipe in a hermetic seal; said device comprising a first flat metal flange member, said flange member being mounted on the end of the first pipe, said first flange member being designed with evenly spaced bolt holes along its peripheral edge and having a single layer of metal foil with correspondingly spaced holes therein pressed firmly against its outer end surface; a second flat metal flange member similar to the first flat metal flange member placed opposite thereto; said second flange member also having a single layer of metal foil containing correspondingly spaced holes; a metal gasket interposed between the two flange members, said gasket held in place by a metal positioner, said gasket having a plurality of phonograph record-like grooves in its sides adjoining said foil layers and having a 1–5° inwardly extending taper; and, a means for compressing said flange members towards each other, the clamping of said gasket and foil covered layers between said flange members producing the desired hermetic seal.

References Cited by the Examiner

UNITED STATES PATENTS

| | | | |
|---|---|---|---|
| 390,770 | 10/1888 | Garnier et al. | 285—363 |
| 830,392 | 9/1906 | Wiedeman | 285—363 X |
| 1,213,132 | 1/1917 | Peterson | 285—363 X |
| 1,715,854 | 6/1929 | McKenzie-Martyn | 285—363 X |
| 1,836,198 | 12/1931 | Spyer | 285—363 X |
| 2,528,665 | 11/1950 | Peterson et al. | |
| 2,590,803 | 3/1952 | Unger et al. | |
| 2,646,997 | 7/1953 | Magos et al. | 285—363 X |
| 3,228,096 | 1/1966 | Albro | 285—363 X |

FOREIGN PATENTS

| | | |
|---|---|---|
| 215,538 | 6/1958 | Australia. |
| 25,323 | 1898 | Great Britain. |

CARL W. TOMLIN, *Primary Examiner.*

THOMAS F. CALLAGHAN, *Examiner.*